(12) United States Patent
Dobkin

(10) Patent No.: US 7,642,759 B2
(45) Date of Patent: Jan. 5, 2010

(54) PARALLELING VOLTAGE REGULATORS

(75) Inventor: Robert C. Dobkin, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 159 days.

(21) Appl. No.: 11/827,704

(22) Filed: Jul. 13, 2007

(65) Prior Publication Data
US 2009/0015070 A1      Jan. 15, 2009

(51) Int. Cl.
G05F 3/10    (2006.01)
G05F 1/567   (2006.01)

(52) U.S. Cl. .................. 323/269; 323/280; 323/907

(58) Field of Classification Search ........... 323/268, 323/269, 273, 274, 275, 280, 907; 363/141
See application file for complete search history.

(56) References Cited

U.S. PATENT DOCUMENTS

| | | | | |
|---|---|---|---|---|
| 3,211,989 A | * | 10/1965 | Mintz et al. | 323/279 |
| 3,617,859 A | | 11/1971 | Dobkin | |
| 3,701,004 A | * | 10/1972 | Tuccinardi et al. | 323/275 |
| 3,959,713 A | | 5/1976 | Davis et al. | |
| 4,199,714 A | * | 4/1980 | Marum | 368/84 |
| 4,461,690 A | * | 7/1984 | Rolff et al. | 204/228.1 |
| 4,476,399 A | * | 10/1984 | Yoshida et al. | 307/44 |
| 4,877,972 A | | 10/1989 | Sobhani et al. | |
| 6,140,804 A | * | 10/2000 | Parker | 323/273 |
| 6,385,024 B1 | | 5/2002 | Olson | |
| 6,822,426 B1 | | 11/2004 | Todd et al. | |
| 2002/0135338 A1 | | 9/2002 | Hobrecht et al. | |
| 2005/0046461 A1 | | 3/2005 | Huang et al. | |

FOREIGN PATENT DOCUMENTS

CH    659 156 A5    12/1986
FR    2 548 403     1/1985

OTHER PUBLICATIONS

LM10 Operational Amplifier and Voltage Reference, National Semiconductor, Nov. 1994, pp. 1-18.
Jordan, Mark. UC3907 Load Share IC Simplifies Parallel Power Supply Design, Unitrode Application Note, pp. 3-203-3-212.
Rewinkel, Wayne. Double Your Output Current with Parallel Voltage Regulators, Electronic Design, http://www.elecdesign.com/Articles/Index.cfm?AD=1&ArticleID=9270.
European Search Report issued in European Patent Application No. EP 08101358.3-1239, dated Jul. 3, 2008.

* cited by examiner

*Primary Examiner*—Gary L Laxton
(74) *Attorney, Agent, or Firm*—McDermott Will & Emery LLP; Michael E. Shanahan

(57) ABSTRACT

Circuits and methods for paralleling voltage regulators are provided. Improved current sharing and regulation characteristics are obtained by coupling control terminals of the voltage regulators together which results in precise output voltages and proportional current production. Distributing current generation among multiple paralleled voltage regulators improves heat dissipation and thereby reduces the likelihood that the current produced by the voltage regulators will be temperature limited.

47 Claims, 2 Drawing Sheets

PARALLELING VOLTAGE REGULATORS

BACKGROUND OF THE INVENTION

The invention relates to voltage regulators. More particularly, the inventions described herein relate to systems and methods for interconnecting voltage regulators to provide simple current sharing techniques and improved regulation characteristics.

Voltage regulators are found in virtually every device that requires electricity. The purpose of a voltage regulator circuit is to control and regulate voltage from a power source to a load, typically through certain conditioning and regulation circuitry. A typical application of voltage regulator circuitry is to convert AC power, provided by a power utility, to a regulated DC voltage suitable for use with consumer electronics. Such power supplies are controlled by a voltage regulator. Although voltage regulators are implemented as stand alone systems, often they are constructed as integrated circuits (ICs) and used in various applications including communication and computing systems.

Two or more voltage regulators may be connected together to provide greater output current. Factors favoring the parallel of connection voltage regulators include the need to dissipate heat over a wider area as well as increase output current. In some instances, many voltage regulators may be connected together to provide additional voltage to a load. In other instances, the voltage regulators may be connected in parallel to provide additional load current. In such instances, the connected voltage regulators are typically configured in an attempt to share current to the load. This may be done in order to promote load balancing and/or to maintain system operation within a desired peak temperature range.

As manufactured, voltage regulators experience wide variation in output voltage, thereby making current matching between directly paralleled voltage regulators relatively difficult to achieve.

The portion of load current supplied by each parallel connected voltage regulator is often dependent on the difference in output voltage and output impedance of the respective voltage regulators. Thus, when voltage regulators are connected in parallel, the regulator having the higher output voltage typically supplies more current than the supply with a lower output voltage. As a result, the supply with the higher output voltage may provide most or all of the current to the load. Moreover, the regulator providing the highest output voltage may limit in overload before the other regulators begin to supply current. This unbalanced condition is further exacerbated if the regulator with the higher output voltage also has the lower output impedance of the two (or more) supplies.

The unequal sharing of load current by paralleled voltage regulators may degrade both the performance and reliability of a power system. This problem is of particular concern for surface mounted voltage regulators due to the inherent limitation of power dissipation when mounted on a circuit board. In certain situations, the additional thermal stress resulting from such severe current imbalances may reduce component lifetime in the sourcing supply by 50% or more.

Various techniques have been used to balance current among parallel connected voltage regulators. One known current sharing technique involves the use of a "share bus" configuration in which output current information is shared among the parallel connected regulators to regulate current. In such systems, a current sense resistor is used to develop a voltage which represents the output current of the parallel connected voltage regulators. This voltage is reproduced on the share bus and monitored by the voltage regulators to determine how much current to provide. Because the power supplies are providing current based on both an internal error voltage (for individual supply regulation) and the voltage on the share bus (for group regulation), current is supplied approximately equally. One drawback with this arrangement, however, is the need for complicated controller circuitry and specialized interconnections among the voltage regulators.

Accordingly, it would be desirable to provide circuits and methods for the efficient sharing of current among paralleled voltage regulators that does not degrade voltage regulation.

Moreover, it would be desirable to provide circuits and methods for heat dissipation in parallel coupled voltage regulators that result in improved current sharing.

SUMMARY OF THE INVENTION

Circuits and methods for paralleling voltage regulators are provided which efficiently share current among paralleled voltage regulators and that does not degrade voltage regulation. The parallel coupled voltage regulators of the present invention enjoy improved heat dissipation and current sharing over a broad operating range.

In one embodiment, a method of coupling two or more voltage regulators in parallel to provide a combined output current is provided, including providing a first voltage regulator that generates a substantially constant voltage, the first voltage regulator having a power output stage; the first voltage regulator output stage having a control input and an output, a second voltage regulator that generates a substantially constant voltage, the second voltage regulator having a power output stage; the second voltage regulator output stage having a control input and an output, coupling the control input of the first voltage regulator output stage to the control input of the second voltage regulator output stage such that the voltage at an output of the first voltage regulator and the second voltage regulator is substantially equal; and coupling the output of the first voltage regulator to the output of the second voltage regulator in parallel such that current produced is substantially equal to the sum of current produced by the first voltage regulator and the second voltage regulator.

In certain embodiments, the invention may further include minimizing the voltage difference between the control input and the output of the first regulator output stage. Ballast resistors having small resistance values may be used in some embodiments to further improve the precision of output current without sacrificing load regulation. Other aspects of the invention include effective heat dissipation which minimizes hot spots and the need for separately mounted voltage regulators and heat sinks in surface mounted circuit board applications.

In other embodiments, a voltage regulator suitable for implementation on an integrated circuit is provided that supplies a substantially constant output voltage and is suitable for coupling to one or more voltage regulators in parallel to provide a combined output current, the voltage regulator circuit comprising, a current reference circuit for providing a substantially constant output current, a set impedance coupled to the current reference circuit for generating a substantially constant set voltage from the substantially constant output current, an amplifier circuit coupled to the current reference circuit and the set impedance that generates a substantially constant output voltage based on the set voltage, and a ballast impedance coupled to the output of the amplifier circuit for establishing an output impedance of the voltage regulator circuit. In such embodiments, the load regulation of the voltage regulator may be substantially independent of output voltage.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
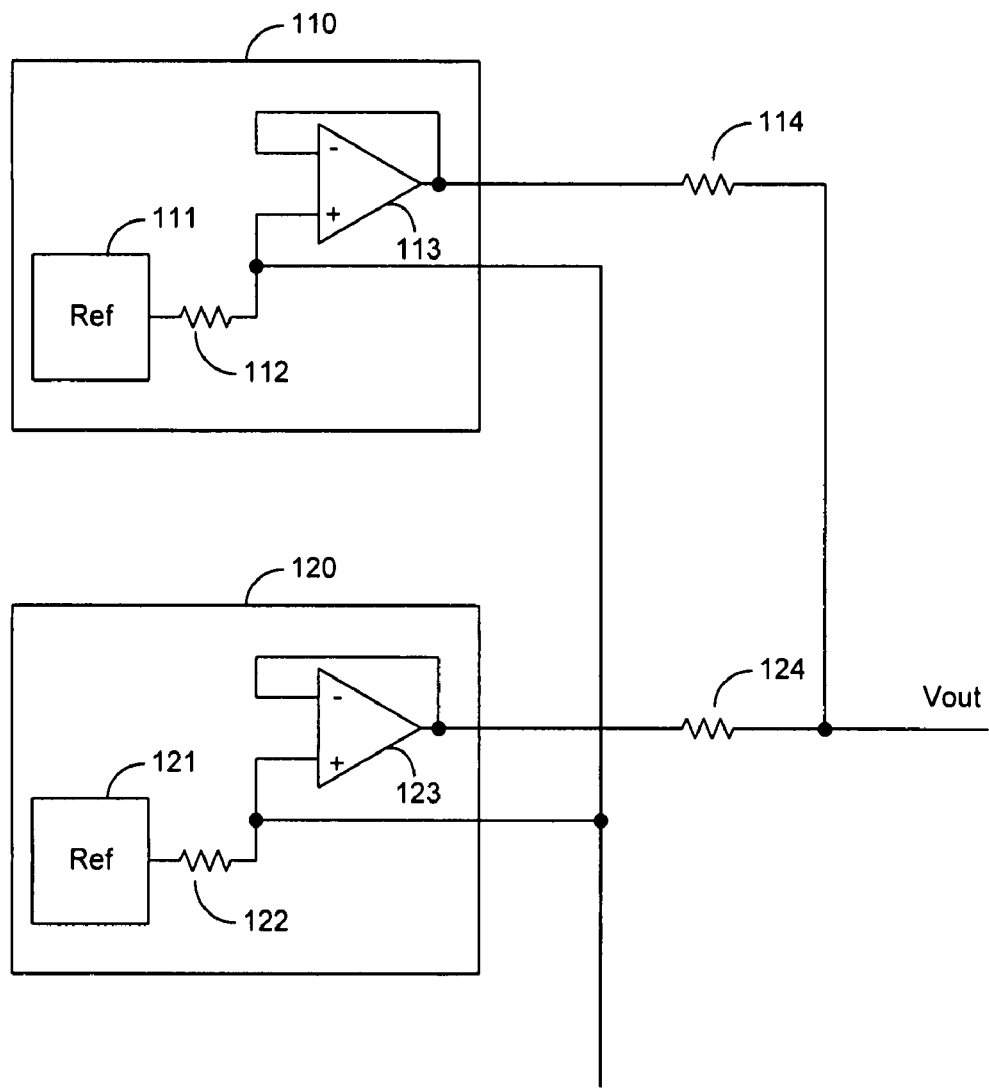
FIG. 1 is a diagram of one embodiment of parallel connected voltage regulators in accordance with the principles of the present invention.

A diagram of one embodiment of two parallel connected voltage regulators constructed in accordance with the principles of present invention is shown in FIG. 1. As shown, system 100 generally includes voltage regulator circuits 110 and 120. Voltage regulator circuit 110 may generally include a voltage reference circuit 111 and a power output stage driven by resistor 112 and operational amplifier 113. Similarly, voltage regulator circuit 120 may generally include a voltage reference circuit 121 and a power output stage driven by resistor 122 and operational amplifier 123. For simplicity, only two voltage regulators are shown in FIG. 1. However, additional voltage regulators may be added as shown, if desired. This may be done, for example, to further improve the aggregate current sourcing capability of system 100.

In operation, voltage reference circuits 111 and 121 may provide a predetermined voltage through resistors 112 and 122 to the non-inverting input of amplifiers 113 and 123 respectively, which are preferably configured as voltage followers (i.e., provide a current gain with unity voltage). This causes amplifiers 113 and 123 to generate an output with voltages substantially equal to their input. Each output signal may be passed through ballast resistors 114 and 124 to generate a composite output $V_{OUT}$, which is a combination of the two outputs. The ballast resistors help establish a maximum current imbalance between voltage regulators 110 and 120 at full output and help minimize overall current imbalance of system 100.

As shown in FIG. 1, because the non-inverting inputs of amplifiers 113 and 123 are coupled together, their respective outputs are substantially equal in voltage. Each non-inverting input may be considered a control input of regulators 110 and 120. If ballast resistors 114 and 124 are configured to have substantially the same value, then the output current of each regulator is substantially the same as well. Thus, for example, if voltage regulators 110 and 120 are each configured to provide a 5 volt output at 1 amp (5 watts), the total output of system 100 would be 5 volts (same voltage) but at 2 amps (10 watts).

In some embodiments, an external voltage regulator circuit (not shown) may be coupled to the control input of regulator 110 and/or 120 which may be used to establish the output voltage of the paralleled regulators. This allows regulators 110 and 120 to be programmed by sources other than reference circuits 111 and 121. In this case, the voltage follower circuits in each regulator continue to provide the output voltage and shared current as described herein, but based on the value established by the external source. In such embodiments, reference circuits 110 and/or 120 may be turned OFF or disconnected from the voltage follower circuits. Moreover, voltage references 111 and/or 121 may be programmable, so that a manufacturer or end user and set the desired output voltage of the paralleled regulators.

Small mismatches in the output voltages are impressed across the ballast resistors. If the voltage followers are precise, with low offset between input and output, ballast resistors with very low impedance can be used. In general, the lower the value of the ballast resistor, the less degradation in load regulation. Such ballast resistors can be made of a short piece of printed circuit board trace. Generally speaking, the value of the ballast resistors is a function of the precision of the voltage follower circuits. The greater the precision of the voltage followers, the lower the value of the ballast resistors.

In the example above, each voltage regulator provides substantially the same current to a load connected to $V_{OUT}$ (not shown) and thus provides an effective current sharing architecture. Another benefit of this general configuration is that it uses commonly available components and eliminates the need to generate system based signals for output current regulation, greatly simplifying the regulation circuitry.

For example, in integrated circuits, very accurate implementations of the voltage follower circuitry described above may be obtained, allowing, in some instances, the potential difference between amplifiers 113 and 123 to be as low as one to two millivolts of their input. In some embodiments, the offset associated with the voltage followers may be minimized by trimming components during the manufacturing process.

Because the output voltages of each regulator are substantially equal, the value of ballast resistors 114 and 124 may be very low, desirably reducing or eliminating any load regulation loss associated with the resistive ballasting such that the performance of the supplies remain substantially unaffected. In some embodiments, load regulation loss may be in 5-10 millivolt range, which is well within the 1% load regulation requirement commonly specified for voltage regulators. Such low value ballasting resistors may be obtained from less than an inch of copper PC board used to connect the supplies and may have a resistance in the order of about 10 milliohms. Other suitable resistances may be specified by a manufacturer of specific embodiments of the devices described herein.

In addition to providing increased output current, the present invention also provides a means for dissipating heat over a larger area during circuit operation. For example, when a voltage regulator such as regulator 110 is surface mounted on a circuit board, the amount of heat that can be dissipated by that regulator is limited due to various physical constraints, which in turn limits the maximum output current of the regulator. By connecting regulators 110 and 120 in parallel, the heat generated is spread out across a wider area, providing better dissipation and thus better cooling, which allows the two regulators to provide their rated current without running into their thermal limit.

Furthermore, this reduces the number and intensity of "hot spots" on a circuit board, lowers overall peak temperatures and reduces the need for separately mounted voltage regulators with large heat sinks. As a result, multiple voltage regulators may be mounted on the same or closely spaced circuit boards to achieve a desired output current without restriction due to elevated operating temperatures.

Figure 2:
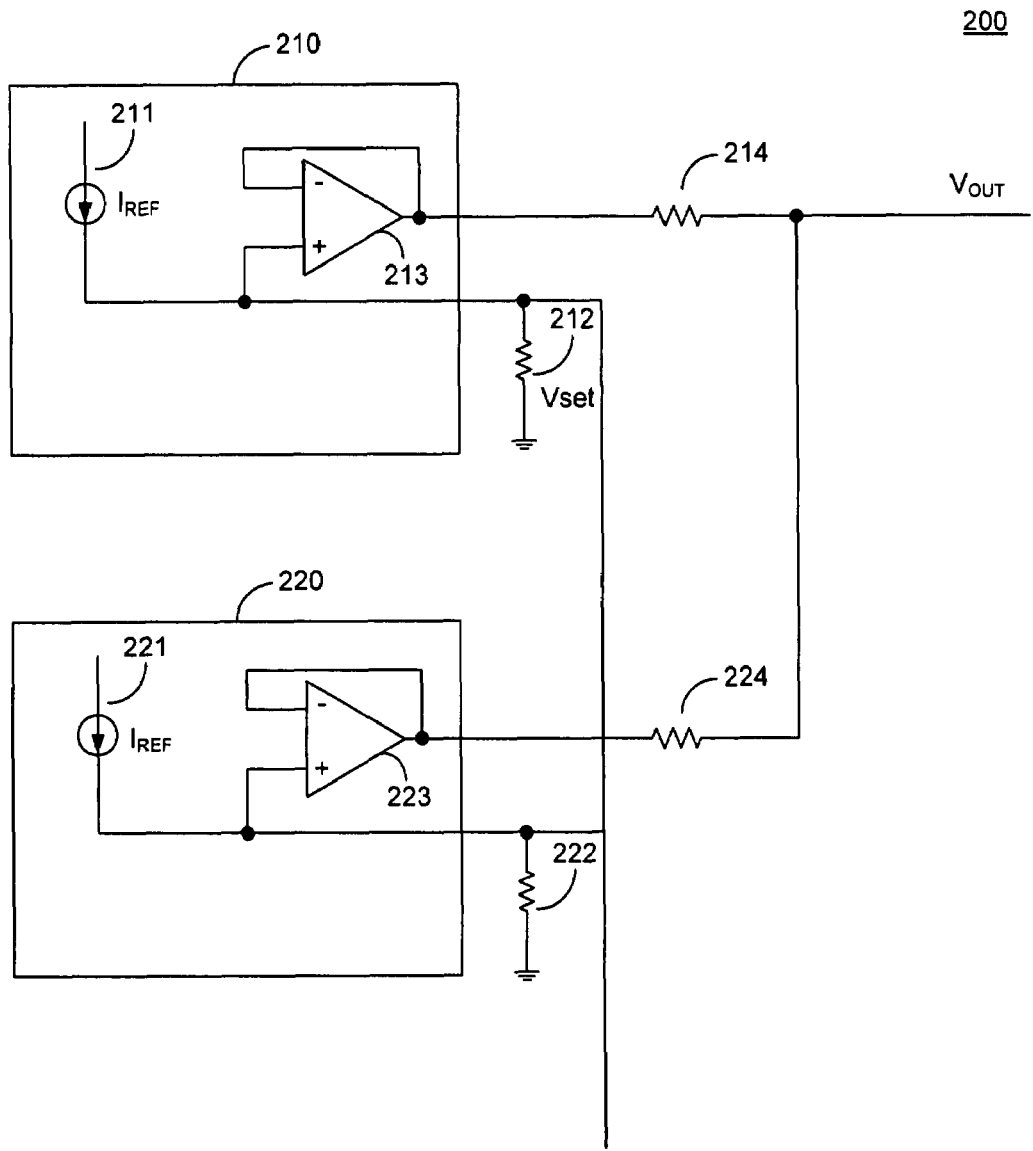
FIG. 2 is a schematic diagram of another embodiment of parallel connected voltage regulators constructed in accordance with the principles of the present invention.

Referring now to FIG. 2, another embodiment 200 constructed in accordance with the principles of the present invention is shown. Circuit 200 is similar in many respects to the circuit described in FIG. 1 and generally includes components and functional blocks which have been numbered similarly to denote similar functionality and general correspondence. For example, circuit 200 includes voltage regulator circuits 210 and 220 (voltage regulators 110 and 120 in FIG. 1), amplifier circuits 213 and 223 (amplifier circuits 113 and 123 respectively in FIG. 1), and ballast resistors 214 and 224 (ballast resistors 114 and 124 in FIG. 1).

As shown, system 200 may operate in substantially the same way as system 100, with the exception of reference circuits 211 and 221. Rather than operate as voltage-based circuits as described in FIG. 1, reference circuits 211 and 221 are configured to provide a substantially constant reference current, with the output voltage of each regulator being set by a resistor to ground. As shown, set resistors 212 and 222 establish a voltage $V_{SET}$ which is provided to the non-inverting input of amplifiers 213 and 223. Once this set voltage is established, circuit 200 may operate similarly to circuit 100 described above. One benefit of using current references is voltage dividers are not required, which provides improved load regulation. Moreover, in such embodiments, load regulation is independent of output voltage. Furthermore, ballast resistors do not need to be scaled to output voltages.

As in circuit 100, the value of ballast resistors 214 and 224 may be very low, and achieve the same load regulation benefits described in connection with the circuit of FIG. 1. Moreover, voltage regulators 210 and 220 with different current sourcing capabilities may be coupled in parallel as shown with ballast resistances 214 and 224 scaled between the voltage regulators to ensure current sharing in the ratio of available current. For example, if the current sourcing capability of voltage regulator 210 is five times greater than that of supply 220, ballast resistors 224 and 214 may be configured in a five to one ratio to allow current to be drawn proportionately from each supply and ensure that system 200 provides a maximum output current.

In some embodiments, resistors 212 and 222 may be external and adjustable to set the output voltage of circuit 200. In other embodiments, only one resistor may be used to set the voltage value for multiple regulators (not shown). Such a resistor may be internal or external and fixed or adjustable. In the case where multiple set resistors are used for multiple supplies, the value of the set resistors may need to be selected in view of the resulting parallel combination in order to achieve the desired resistance and thus the desired output voltage.

In certain other embodiments, e.g., such as those used for integrated circuits, it may be desirable to employ voltage follower circuits that have a negative temperature coefficient (i.e., a voltage follower circuit whose output voltage decreases after the temperature exceeds a certain point or decreases with temperature). In such embodiments, the negative temperature coefficient itself may be used as a ballasting mechanism (e.g., with or without the use of ballasting resistors).

For example, in operation, assume regulators 210 and 220 are configured such that they both have substantially the same negative temperature coefficient. If one of these supplies begins to source more current than the other, or provides current above that specified in a predetermined ratio, that supply will begin to rise in temperature. The built in temperature coefficient of that regulator will provide temperature regulation, which reacts to the temperature increase (i.e., unequal temperature rise) and causes its output voltage to correspondingly decrease. This, in turn, causes the current to adjust as well (based on the thermal resistance characteristics and temperature of the regulators). As a result, the output current of the supplies return to a state where the output current is balanced to a certain degree (e.g., based on how closely certain factors are matched such as temperature coefficient, heat sinking capability, ambient temperature, etc.).

In such embodiments, current sharing based on temperature regulation does not require the use of ballast resistors (e.g., resistors 114, 124, 214 and 224). However, small impedances may be used if desired to achieve further output precision. Moreover, in some embodiments, heat sinking by itself may be used as a means of establishing current ratios between supplies. For example, if two (or more) supplies capable of producing substantially the same or similar current, with substantially the same negative temperature coefficient are provided with different heat sinks, the supply with the lesser heat sinking capability may provide proportionally less current based on its temperature limits. Thus, if an operating temperature range is known, various paralleled voltage regulators can be provided with heat sinks that will allow them to provide current in a desired ratio based on their respective heat dissipation characteristics.

Similarly, in some embodiments, the temperature regulation itself may be used as a means of establishing current ratios between supplies. For example, if two (or more) regulators capable of producing substantially the same or similar current are provided with different negative temperature coefficients, the regulator with the more negative temperature coefficient may provide proportionally less current based its temperature limits.

Moreover, it will be apparent from the foregoing that both heat sinking and temperature coefficient factors may be combined to establish current sharing parameters between voltage regulators, e.g., supplies with less negative temperature coefficients having more heat sinking capability may be coupled with supplies having more negative temperature coefficients and less heat sinking capability, the former providing proportionally more current than the latter, etc. Such implementations may optionally include ballast resistors, if desired to further improve precision. Other configurations are possible as well.

It will be understood that the systems and methods described herein have broad based applicability and may be employed in multiple different contexts. For example, the systems described above may be used in "box" type power supplies such as those commercially produced by Lambda Corporation, Kerco, or Agilent, or in integrated circuit type voltage regulators such as those produced by Linear Technology Corporation of Milpitas Calif., the assignee of this patent application. Accordingly, commonly available circuitry referred to above may include external circuitry commonly available in a box implementation such as easily added components on a circuit board, or, in an IC implementation, may include amplifiers or such components which may be added during design at little or no additional expense.

Moreover, voltage reference circuits 111 and 121 may include any circuitry suitable for supplying a substantially constant predetermined voltage through a resistor, and may include any suitable configuration of switching or linear based regulator or other conventional reference circuitry. Similarly, current reference circuits 211 and 212 may include any circuitry suitable for supplying a substantially constant predetermined current, and may include any suitable configuration of switching or linear based regulator or other conventional reference circuitry. Such reference circuits may include the reference circuits described in co-pending U.S. patent application entitled Bandgap Voltage and Current Reference Ser. No. 11/731,279 filed Mar. 30, 2007 assigned to the assignee of this patent application, which is hereby incorporated by reference in its entirety.

Further, although ballast resistors 114, 124, 214 and 224 are shown as external to voltage regulators 110, 120, 210 and 220 such resistors may, in some embodiments, be internally based. In some embodiments, bonding wires commonly found in an integrated circuit package can also be used as ballast. Also, the regulation itself may act as a ballast. Furthermore, the voltage follower circuitry described herein may be constructed using any suitable topology known in the art. Although such circuits are described herein with a unity voltage gain it will be understood that gains other than unity may be used if desired. At gains above unity, less precise matching is typical and accurate sharing is more difficult. Certain older voltage regulators may operate with a 1-3% error in their output, an may operate above unity gain. Such regulators have difficultly being coupled in parallel as described herein and may rely on large ballast resistors which degrade load regulation. Moreover, in some embodiments, where amplifiers are running at or near their power or ground rails, offset voltages may be employed if desired to prevent or insure cutoff.

Although preferred embodiments of the present invention have been disclosed with various circuits connected to other circuits, persons skilled in the art will appreciate that it may not be necessary for such connections to be direct and additional circuits may be interconnected between the shown connected circuits without departing from the spirit of the invention as shown. Persons skilled in the art also will appreciate that the present invention can be practiced by other than the specifically described embodiments. The described embodiments are presented for purposes of illustration and not of limitation, and the present invention is limited only by the claims which follow.

What is claimed is:

1. A method of coupling two or more voltage regulators in parallel to provide a combined output current, the method comprising: providing a first voltage regulator that generates a substantially constant voltage, the first voltage regulator having a power output stage; the power output stage having a control input and an output; providing a second voltage regulator that generates a substantially constant voltage, the second voltage regulator having a power output stage; the power output stage having a control input and an output; coupling the control input of the first voltage regulator output stage to the control input of the second voltage regulator output stage such that the voltage at an output of the first voltage regulator and an output of the second voltage regulator is substantially equal; coupling the output of the first voltage regulator to the output of the second voltage regulator in parallel such that the combined output current produced is substantially equal to the sum of current produced by the first voltage regulator and the second voltage regulator; and configuring the first voltage regulator output stage to include a voltage follower amplifier coupled to a first voltage reference circuit such that the output voltage of the first voltage regulator is substantially equal to an output voltage of the first voltage reference circuit.

2. The method of claim 1 further comprising minimizing the voltage difference between the control input of the first voltage regulator output stage and the output of the first voltage regulator output stage.

3. The method of claim 2 wherein the output of the first voltage regulator output stage is adjusted to substantially match the voltage on the control input of the first voltage regulator output stage.

4. The method of claim 1 further comprising minimizing the voltage difference between the control input of the second voltage regulator and the output of the second voltage regulator output stage.

5. The method of claim 4 wherein the output of the second voltage regulator output stage is adjusted to substantially match a voltage on the control input of the second voltage regulator.

6. The method of claim 1 further comprising configuring the second voltage regulator output stage to include a voltage follower amplifier coupled to a voltage reference circuit such that the output voltage of the second voltage regulator is substantially equal to an output voltage of the second voltage reference circuit.

7. The method of claim 1 further comprising configuring the first voltage regulator output stage to include a voltage follower amplifier coupled to a first current reference circuit such that the output voltage of the first voltage regulator is substantially equal to an output voltage generated by the first current reference circuit and a first impedance.

8. The method of claim 7 wherein the first impedance is adjustable.

9. The method of claim 7 wherein the first impedance is external to the first voltage regulator.

10. The method of claim 7 further comprising configuring the second voltage regulator output stage to include a voltage follower amplifier coupled to a second current reference circuit such that the output voltage of the second voltage regulator is substantially equal to an output voltage generated by the second current reference circuit and a reference impedance.

11. The method of claim 10 wherein the reference impedance is adjustable.

12. The method of claim 10 wherein the reference impedance is the first impedance.

13. The method of claim 1 further including providing a first ballast impedance coupled to the output of the first output stage, such that a first voltage drop is established by the current of the first voltage regulator.

14. The method of claim 11 wherein the first ballast impedance is formed, at least in part, by bondwire in an integrated circuit package.

15. The method of claim 13 further including providing a second ballast impedance coupled to the output of the second output stage, such that a second voltage drop is established by the current of the second voltage regulator.

16. The method of claim 15 wherein the first ballast impedance is formed, at least in part, by bondwire in an integrated circuit package.

17. The method of claim 1 further comprising disposing the first voltage regulator and the second voltage regulator in different devices.

18. The method of claim 1 further comprising providing the first voltage regulator with a first negative temperature coefficient and the second voltage regulator with a second negative temperature coefficient.

19. The method of claim 18 wherein the first and second negative temperature coefficients are substantially equal.

20. The method of claim 18 wherein the first and second negative temperature coefficients are substantially different from one another and the current provided by the first and second voltage regulators is proportional to a ratio of the first and second negative temperature coefficients.

21. The method of claim 1 further comprising providing the first voltage regulator with a first heat dissipation capability and the second voltage regulator with a second heat dissipation capability.

22. The method of claim 21 wherein the first and second heat dissipation capabilities are substantially equal.

23. The method of claim 20 wherein the first and second heat dissipation capabilities are substantially different and the current provided by the first and second voltage regulators is proportional to a ratio of the first and second heat dissipation capabilities.

24. A device that provides a substantially constant output voltage suitable for coupling to one or more devices in parallel to provide a combined output current, the device comprising: a first voltage regulator that generates a substantially constant voltage, the first voltage regulator having a power output stage; the first voltage regulator power output stage having a control input and an output; wherein the control input of the first voltage regulator power output stage is configured to be coupled to a second voltage regulator, which causes a voltage at the output of the first voltage regulator to be substantially equal to a voltage at an output of the second voltage regulator; and which causes an output current produced by the first voltage regulator through a first ballast impedance to be proportional to an output current produced by the second voltage regulator through a second ballast impedance.

25. The device of claim 24 wherein the first voltage regulator includes a first current reference circuit that produces a first current and the second voltage regulator includes a second current reference circuit that produces a second current such that the output voltage of the device is substantially equal to a sum of the first current and the second current multiplied by a set impedance.

26. The device of claim 24 wherein the output current produced by the first voltage regulator is substantially equal to the output current provided by the second voltage regulator.

27. The device of claim 24 configured to minimize the voltage difference between the control input of the first voltage regulator and the output of the first voltage regulator output stage.

28. The device of claim 27 configured such that the output of the first voltage regulator output stage is adjusted to substantially match a voltage on the control input of the first voltage regulator.

29. The device of claim 24 wherein the first voltage regulator output stage is configured to include a voltage follower amplifier coupled to a first voltage reference circuit such that the output voltage of the first voltage regulator is substantially equal to an output voltage of the first voltage reference circuit.

30. The device of claim 29 wherein the first voltage reference circuit is programmable.

31. The device of claim 24 wherein the first voltage regulator output stage is configured to include a voltage follower amplifier coupled to a first current reference circuit such that the output voltage of the first voltage regulator is substantially equal to an output voltage generated by the first current reference circuit and a first impedance.

32. The device of claim 31 wherein the first impedance is adjustable.

33. The device of claim 31 wherein the first impedance is external to the first voltage regulator.

34. The device of claim 24 wherein the first ballast impedance establishes a first current dependent voltage drop for the first voltage regulator.

35. The device of claim 31 wherein the first ballast impedance is formed, at least in part, by bondwire in an integrated circuit package.

36. The device of claim 24 wherein the first voltage regulator has a negative temperature coefficient and the second voltage regulator has a negative temperature coefficient and the output current provided by the first voltage regulator is proportional to a ratio of a temperature of the first voltage regulator and a temperature of the second voltage regulator.

37. The device of claim 24 wherein the first voltage regulator further includes a first heat sink wherein the current provided by the first voltage regulator is proportional to a ratio of a heat dissipation capability of first heat sink and a heat dissipation capability of the second voltage regulator.

38. A voltage regulator disposed on an integrated circuit that provides a substantially constant output voltage suitable for coupling to one or more voltage regulators in parallel to provide a combined output current, the voltage regulator circuit comprising: a current reference circuit for providing a substantially constant output current; a set impedance coupled to the current reference circuit for generating a substantially constant set voltage from the substantially constant output current; an amplifier circuit coupled to the current reference circuit and the set impedance that generates a substantially constant output voltage based on the set voltage, and; a ballast impedance coupled to the output of the amplifier circuit for establishing an output impedance of the voltage regulator circuit.

39. The voltage regulator of claim 38 further wherein the ballast impedance is minimized to improve load regulation.

40. The voltage regulator of claim 39 wherein the ballast impedance is formed by bondwire in the integrated circuit.

41. The voltage regulator of claim 38 wherein the amplifier circuit further includes a control input, the substantially constant set voltage being coupled to the control input, and wherein the voltage regulator is configured to minimize the voltage difference between the control input of the amplifier and the output of the voltage regulator.

42. The voltage regulator of claim 41 configured such that the output of the amplifier circuit is adjusted to substantially match the voltage on the control input.

43. The voltage regulator of claim 38 wherein the amplifier circuit is configured to include a voltage follower amplifier coupled to the current reference circuit such that the output voltage of the voltage regulator is substantially equal to the set voltage.

44. The voltage regulator of claim 38 wherein the first voltage reference circuit is programmable.

45. The voltage regulator of claim 38 wherein the set impedance is adjustable.

46. The voltage regulator of claim 45 wherein the set impedance is external to the integrated circuit.

47. The voltage regulator of claim 38 wherein load regulation is substantially independent of output voltage.

* * * * *